United States Patent

[11] 3,612,448

[72] Inventor Leonard P. Frieder
 Clarks Green, Pa.
[21] Appl. No. 5,278
[22] Filed Jan. 23, 1970
[45] Patented Oct. 12, 1971
[73] Assignee Gentex Corporation
 New York, N.Y.

[54] AERIAL DELIVERY SYSTEM
 12 Claims, 4 Drawing Figs.
[52] U.S. Cl. .................................................... 244/138 R
[51] Int. Cl. .................................................... B64d 1/02
[50] Field of Search .......................................... 244/138 R,
 138 A, 137 R, 137 P, 136; 212/71; 294/83 A, 84

[56] References Cited
 UNITED STATES PATENTS
3,096,055 7/1963 Cotton ......................... 244/137
3,113,751 12/1963 Cotton ......................... 244/137
3,520,501 7/1970 Brown et al. ................. 244/137

Primary Examiner—Milton Buchler
Assistant Examiner—F. K. Yee
Attorney—Shenier and O'Connor ABSTRACT: An aerial delivery system for delivering a load of supplies or the like to a boat at sea from an aircraft in which respective buoyant weights carrying marker lights and having small parachutes attached thereto are secured to the ends of a buoyant guideline which slidably receives a ring attached to the load for movement to a position between spaced stops on the line at a location intermediate the line ends. A larger parachute attached to the load automatically releases upon impact of the load on the water. The auxiliary parachutes attached to the weights act as sea anchors which are automatically released after a period of time in the water. In use of the system the first weight and then the load and then the second weight are sequentially released from the aircraft along a flight path upwind of the boat.

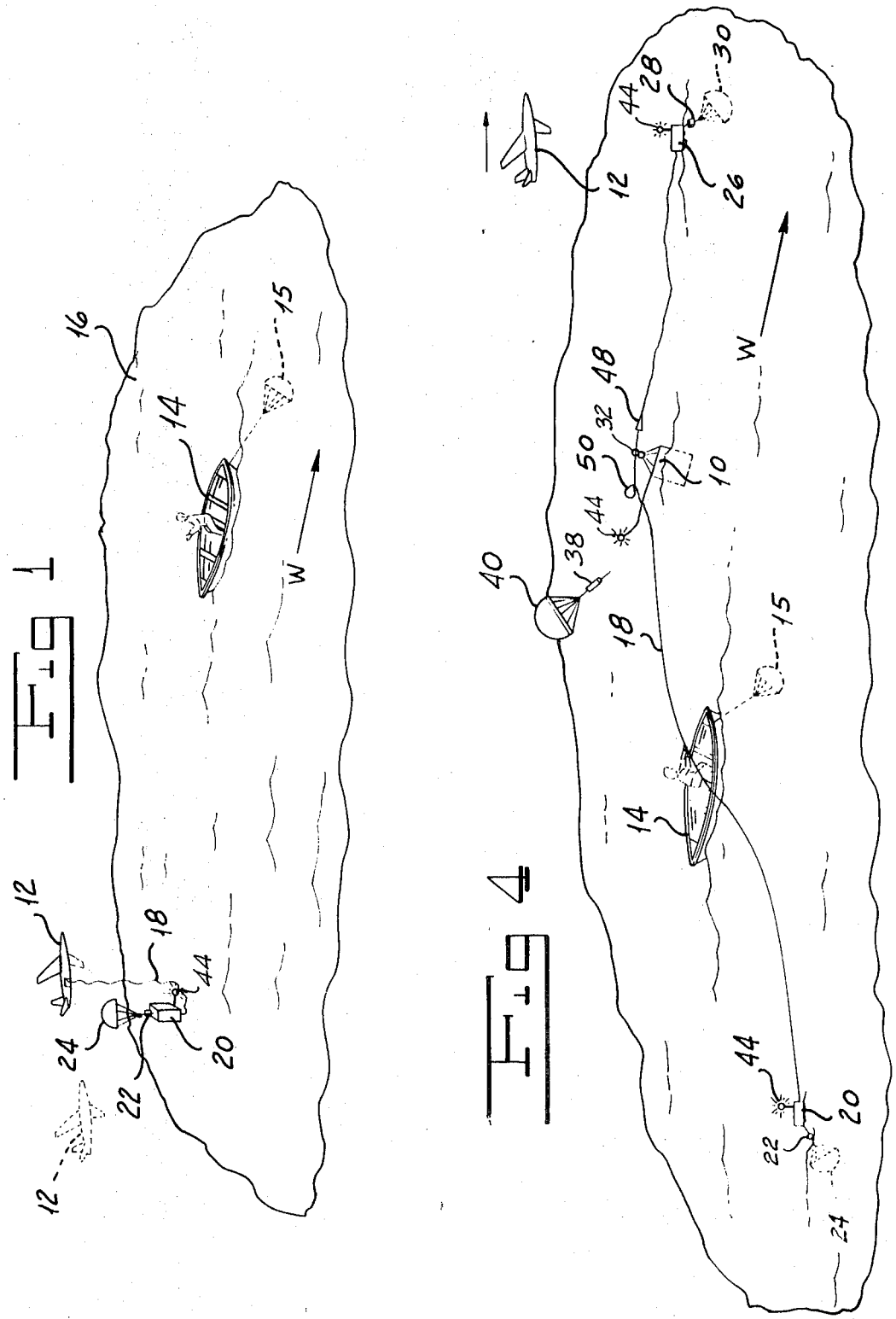

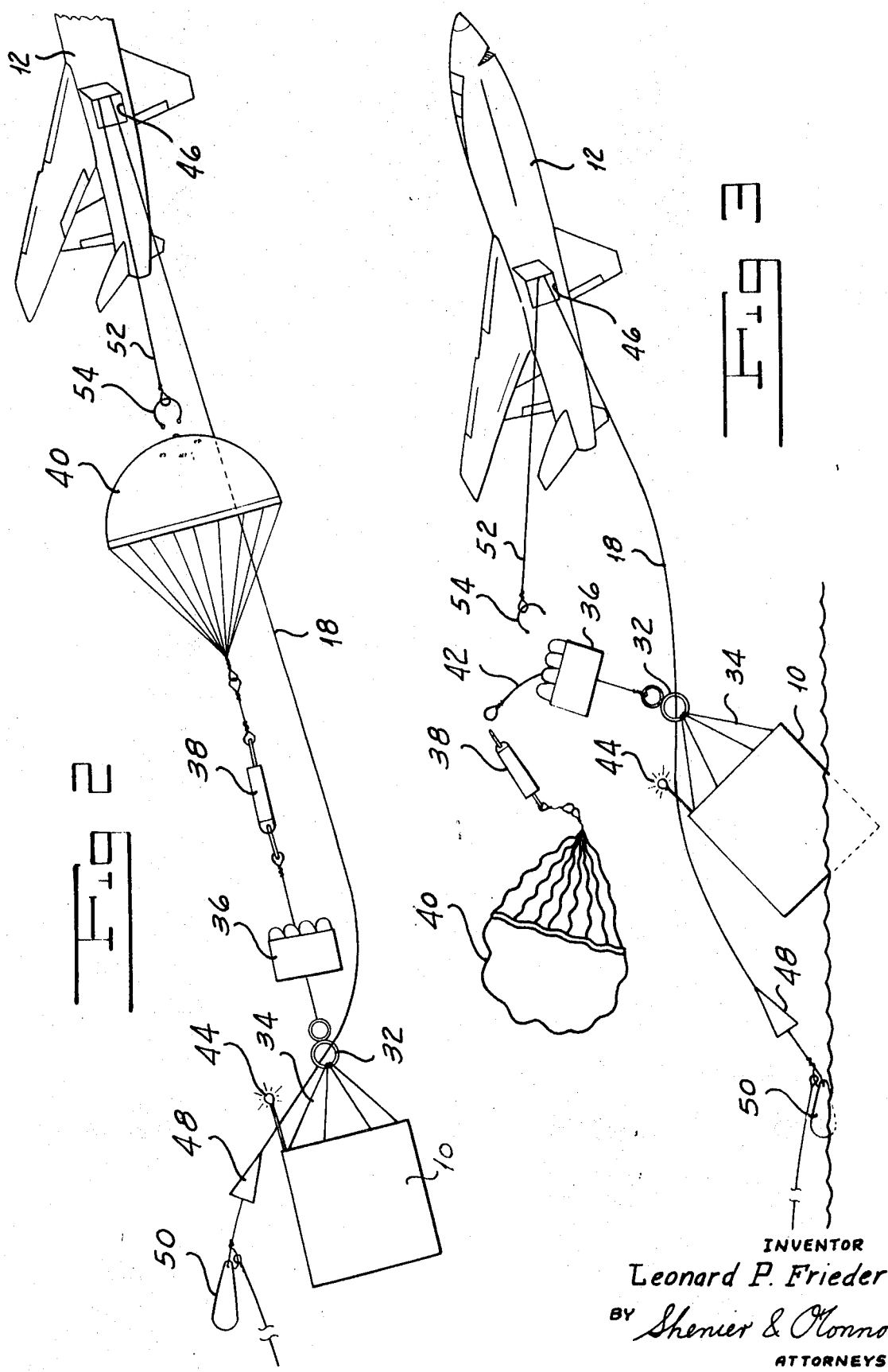

3,612,448

AERIAL DELIVERY SYSTEM

BACKGROUND OF THE INVENTION

Various systems have been proposed in the prior art for dropping loads of supplies or rescue equipment or the like from an aircraft to small boats at sea. Such systems have many requirements. First and foremost, of course, is that they be certain in operation to insure that the load reaches the boat for which it is intended. Secondly, it is desirable that they be as accurate as is possible in that the load should be positioned as closely to the boat as is possible without actually striking the boat. A further desirable characteristic of such a system is that it be arranged to drop a number of loads in sequence as rapidly as is possible. The systems should operate under relatively adverse weather conditions. The load should be made readily accessible to a person in the boat.

I have invented an aerial delivery system which effectively achieves all of the requirements and desiderata outlined above. My system insures that the load reaches the boat for which it is intended. My system is accurate yet safe. My system enables a number of loads to be dropped in sequence in a relatively short period of time. It permits a load to be delivered under adverse weather conditions. It facilitates retrieval of the load by a person in the boat.

SUMMARY OF THE INVENTION

One object of my invention is to provide a system for delivering a load from an aircraft to a craft at sea.

Another object of my invention is to provide an aerial delivery system which insures that a load dropped from an aircraft reaches a craft at sea.

A further object of my invention is to provide an aerial delivery system which makes a load dropped at sea accessible to a person in a craft for which the load is intended.

Still another object of my invention is to provide an aerial delivery system which permits a number of loads to be dropped in sequence in a relatively short period of time.

A still further object of my invention is to provide an aerial delivery system which functions effectively under relatively adverse weather conditions.

Other and further objects of my invention will appear from the following descriptions.

In general, my invention contemplates the provision of an aerial delivery system including respective buoyant weights secured to the ends of a buoyant guideline which slideably receives a ring connected to the load for movement along the line from the aircraft toward the sea to a position between stops on the line. I provide an impact release main parachute for the load and auxiliary parachutes for the weights which act as sea anchors and which are automatically released after a period of time in the water. One of the weights and then the load and then the other weight are dropped in sequence from the aircraft along a flight line upwind of the craft at sea.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a schematic view illustrating my aerial delivery system during the initial part of its operation.

FIG. 2 is a schematic view of my aerial delivery system showing the positions of the components at an intermediate point following the condition shown in FIG. 1.

FIG. 3 is a schematic view of my aerial delivery system at a further point in the course of its operation.

FIG. 4 is a schematic view showing the positions of the components of my aerial delivery system after the completion of the drop.

DESCRIPTION OF THE PREFERRED EMBODIMENT

Referring now to the drawings, my aerial delivery system is intended for use in delivery of a load 10 of supplies, rescue equipment, or the like, from an aircraft 12 to a craft 14 at sea indicated by the reference character 16. The craft 14 may be equipped with a sea anchor 15. In the situation in which I have illustrated my system in use, I have indicated the wind direction by the arrow W in the drawings.

My system includes a guideline 18 which may be formed from any suitable buoyant textile material having the capability of supporting the load 10 as it slides down the line in a manner to be described and at the same time being sufficiently buoyant so that it will float on the surface of the sea 16. For example, I may form the line from polypropylene. I secure a first buoyant weight 20 to one end of the line 18 by any suitable means known to the art. A releasing device 22, which will be described more fully hereinafter, attaches a small parachute 24 to the weight 20. The weight 20 may be of any suitable material which is sufficiently heavy so as to draw the line 18 out of the aircraft 12 while at the same time being buoyant so as to support one end of the line 18 on the surface of the sea 16.

I secure a second buoyant weight 26 to the other end of the line 18 by any suitable means. Another automatic release device 28 similar to the device 22 secures a second auxiliary parachute 30 to the weight 26. Weight 26 may be constructed of the same material as is the weight 20. In one particular embodiment of my invention, I form the buoyant weights 20 and 26 as blocks of wood.

I secure a double ring 32 to the load 10 by any suitable means such, for example, as by a bridle 34. I attach the pack 36 of the main parachute to be described hereinafter to the other ring of the double ring 32. A device 38 adapted to release upon impact of the load 10 on the sea 16 secures the main parachute 40 to a line 42 connected to the pack 36. One device which may be used as the automatic release device 38 is shown and described in U.S. Pat. No. 2,410,816 issued Nov. 12, 1946. It will readily be appreciated that the size of the parachutes 24, 30 and 40 is determined by the size of the weights 20 and 26 and by the size and weight of the load 10. Line 18 passes through the first ring of the double ring 32 slideably to support the load on the line 18. Preferably I provide the weights 20 and 26 and the load 10 with signal lamps 44 which may be manually turned on as the various components are released from the aircraft 12.

Normally, all of the components described above are stored in the aircraft 12 and are adapted to be released through a hatch 46 in the aircraft. Line 18 carries adjacent the center of its length a first conical stop 48 having such a large diameter that it will just fit through the ring through which line 18 extends and having its point directed toward the craft so that after the ring has passed the stop, the stop cannot readily be drawn back through the ring. A second stop 50 is secured to line 18 at a position in a direction from the aircraft somewhat beyond stop 48. I construct stop 50 with such a diameter that it cannot pass through the ring of the double ring 32 through which line 18 passes.

In use of my system to deliver the load 10 to the craft 14 at sea from the aircraft 12, the pilot proceeds along the course upwind of the craft 14 and at a suitable point drops the first weight 20 and its chute 24. Before that occurs, all of the signal lamps 44 may be lit. As the weight drops toward the sea, line 18 streams out of the craft 12. When it strikes the water, chute 24 submerges to act as a sea anchor for weight 20 to hold it in a dead position on the sea 16. A predetermined time after weight 20 has been dropped, the load 10 and its chute 40 are released with the chute being extended by means of a static line 52 and a frangible band 54 in a manner known to the art. The weight floats downwardly being guided along the line 18. Upon impact of the load 10, device 38 releases in a manner known to the art to detach chute 40 from line 42. The line 18 continues to stream out of the craft, and stop 48 is drawn through ring 32 to position the load 10 along the line 18. Finally, the weight 26 and its chute 30 are dropped so that the chute 30 acts as a sea anchor when the weight 26 is on the water. In this position of the components as illustrated in FIG. 4, line 18 is accessible to a person in the craft 14 so that he can begin to draw the load 10 toward the craft. In order to facilitate this operation, the two devices 22 and 28 release the sea anchors 24 and 30 after short period of time in the water. To achieve that result, the devices 22 and 28 may be sea water soluble or they may be pyrotechnic timing devices or the like. Once the sea anchors have been released, the individual in the craft 14 may draw the load toward the craft with relative ease. The stop prevents the load 10 from slipping along the line as this is done.

In a particular instance of use of my system, the load of supplies is deployed from the aircraft about one or two seconds after the first weight 20 is dropped. When the end of the guideline in the aircraft is approached, it automatically draws the second weight 26 and its chute out of the aircraft. The devices 22 and 28 may be arranged to disconnect the sea anchors after about 3 minutes in the water.

My system may operate under conditions of a minimum altitude of about 200 feet absolute with a 500-foot minimum ceiling absolute at a minimum visibility of 1 nautical mile, wind conditions calm to about 30 knots and sea conditions calm to Douglas 4. The load 10 has a maximum capacity of about 6 cubic feet and a weight of about 105 pounds. My system permits delivery of a load 10 at about every 2 minutes.

It will be seen that I have accomplished the objects of my invention.

I have provided an aerial delivery system for delivering a load from an aircraft to a craft at sea. My system is certain in operation. It insures that the load is accessible to a person in the craft at sea. It permits successive deliveries to be made in a relatively short period of time. It is capable of operation under relatively adverse weather conditions.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A system for delivering a load from an aircraft to a location at sea including in combination, an elongated buoyant line, a first buoyant weight attached to said line adjacent one end thereof, a second buoyant weight attached to said line adjacent the other end thereof, and means for slidably attaching said load to said line between said weights, said first weight and said load and said second weight being released from said aircraft in sequence.

2. A system as in claim 1 including means for positioning said load at a location intermediate the ends of said line as said load slides along said line after release of said first weight and said load in sequence.

3. A system as in claim 1 including spaced stops carried by said line at a location intermediate the ends thereof for positioning said load at a location intermediate the ends of said line as said load slides along the line after release of said weight and said load in sequence.

4. A system as in claim 1 including spaced stops carried by said line at a location intermediate the ends thereof for positioning said load at a location intermediate the ends of said line as said load slides along the line after release of said weight and said load in sequence and a parachute attached to said load.

5. A system as in claim 1 including spaced stops carried by said line at a location intermediate the ends thereof for positioning said load at a location intermediate the ends of said line as said load slides along the line after release of said weight and said load in sequence, a parachute attached to said load and means for automatically releasing said parachute from said load upon impact of said load on the sea.

6. A system as in claim 1 including spaced stops carried by said line at a location intermediate the ends thereof for positioning said load at a location intermediate the ends of said line as said load slides along the line after release of said weight and said load in sequence, a parachute attached to said load, means for automatically releasing said parachute from said load upon impact of said load on the sea and auxiliary parachutes attached to said weights.

7. A system as in claim 1 including spaced stops carried by said line at a location intermediate the ends thereof for positioning said load at a location intermediate the ends of said line as said load slides along the line after release of said weight and said load in sequence, a parachute attached to said load, means for automatically releasing said parachute from said load upon impact of said load on the sea and auxiliary parachutes attached to said weights, and auxiliary parachutes acting as sea anchors when said weights are on the sea.

8. A system as in claim 1 including spaced stops carried by said line at a location intermediate the ends thereof for positioning said load at a location intermediate the ends of said line as said load slides along the line after release of said weight and said load in sequence, a parachute attached to said load, means for automatically releasing said parachute from said load upon impact of said load on the sea, auxiliary parachutes attached to said weights, said auxiliary parachutes acting as sea anchors when said weights are on the sea and means for automatically releasing said sea anchors after a period of time in the water.

9. A system as in claim 1 in which said load-attaching means comprises a ring through which said line passes, said positioning means comprising a first stop on said line for permitting passage of said ring thereover in a direction from said aircraft toward said first weight while inhibiting passage of said weight thereover in the other direction and a second stop located between said first stop and said first weight for arresting said ring.

10. A system as in claim 1 in which said load-attaching means comprises a ring through which said line passes, a first stop secured to said line between said weights, said first stop permitting passage of said ring thereover in a direction from said aircraft toward said first weight while inhibiting passage of said ring thereover in the other direction, and a second stop secured to said line between the first stop and the first weight for preventing movement of said ring beyond the second stop.

11. A method of delivering a load from an aircraft to a craft at sea including the steps of directing said aircraft along a crossing flight path upwind of said craft, dropping a first buoyant weight attached to one end of a buoyant line at a point of said path while approaching said craft, retaining the other end of said line in said aircraft, sliding said load along said line from said aircraft toward the sea while retaining said other end on said aircraft, and dropping said other end and a second buoyant weight attached thereto at a point on said path while going away from said craft.

12. A method as in claim 11 including the step of stopping said load at a point intermediate the ends of said line after dropping said load.